US007515324B2

(12) United States Patent
Hui

(10) Patent No.: US 7,515,324 B2
(45) Date of Patent: Apr. 7, 2009

(54) SYSTEM AND METHOD FOR RESOLVING RESET CONFLICTS IN A PHASED-RESET SPATIAL LIGHT MODULATOR SYSTEM

(75) Inventor: Sue Hui, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 359 days.

(21) Appl. No.: 11/550,008

(22) Filed: Oct. 17, 2006

(65) Prior Publication Data

US 2008/0088909 A1 Apr. 17, 2008

(51) Int. Cl.
*G02F 1/00* (2006.01)
*G02F 1/01* (2006.01)
*G02F 1/03* (2006.01)
*G09G 3/34* (2006.01)

(52) U.S. Cl. ....................... 359/237; 359/238; 359/245; 359/249; 359/298; 345/84; 345/85; 345/108; 345/204; 345/690; 348/771

(58) Field of Classification Search ................ 359/223, 359/237, 238, 245, 249, 290, 291, 298, 634; 345/84, 85, 89, 100, 108, 151, 204, 690–692, 345/698; 348/204–206, 528, 731, 743, 770, 348/771; 327/143; 375/142
See application file for complete search history.

(56) References Cited

U.S. PATENT DOCUMENTS

| | | | | |
|---|---|---|---|---|
| 5,278,652 | A | 1/1994 | Urbanus et al. | |
| 5,528,317 | A * | 6/1996 | Gove et al. | 348/743 |
| 6,008,785 | A | 12/1999 | Hewlett et al. | |
| 6,115,083 | A | 9/2000 | Doherty et al. | |
| 6,201,521 | B1 | 3/2001 | Doherty | |
| 6,898,019 | B2 * | 5/2005 | Hewlett et al. | 359/634 |
| 6,967,759 | B2 * | 11/2005 | Hewlett et al. | 359/242 |
| 6,987,597 | B2 * | 1/2006 | Hewlett et al. | 359/238 |
| 7,019,881 | B2 * | 3/2006 | Doherty et al. | 359/249 |
| 7,161,608 | B2 * | 1/2007 | Pettitt et al. | 345/690 |
| 7,233,427 | B2 * | 6/2007 | Doherty et al. | 359/245 |
| 7,403,187 | B2 * | 7/2008 | Hewlett et al. | 345/108 |
| 7,405,856 | B2 * | 7/2008 | Doherty et al. | 359/245 |
| 2005/0146542 | A1 | 7/2005 | Hewlett et al. | |

* cited by examiner

*Primary Examiner*—Loha Ben
(74) *Attorney, Agent, or Firm*—Wade James Brady, III; Frederick J. Telecky, Jr.

(57) ABSTRACT

A system for, and method of resolving reset conflicts in a phased-reset SLM system and a projection visual display system incorporating the system or the method. In one embodiment, the system includes a reset conflict arbiter configured to receive reset instructions containing conflicts from a sequence generator and resolve the conflicts by shifting an execution time of a selected one of the reset instructions according to a conflict resolution method.

21 Claims, 8 Drawing Sheets

SYSTEM AND METHOD FOR RESOLVING RESET CONFLICTS IN A PHASED-RESET SPATIAL LIGHT MODULATOR SYSTEM

TECHNICAL FIELD OF THE INVENTION

The invention is directed, in general, to spatial light modulator (SLM) systems and, more particularly, to a system and method for resolving reset conflicts in a phased-reset SLM system.

BACKGROUND OF THE INVENTION

Video display systems based on SLMs are increasingly being used as an alternative to display systems using cathode ray tubes (CRTs). SLM systems provide high-resolution displays without the bulk and power consumption of CRT systems. As used for image display applications, SLMs include arrays of micro-mirrors that reflect light to an image plane. These micro-mirrors are often referred to as picture elements or "pixels," as distinguished from the pixels of an image. This use of terminology is typically clear from context, so long as it is understood that more than one pixel of the SLM array may be used to generate a pixel of the displayed image.

Digital micro-mirror devices (DMDS) are a type of SLM, and may be used for either direct-view or projection display applications. A DMD has an array of hundreds or even thousands of micro-mechanical pixels, each having a tiny mirror that is individually addressable by an electronic signal. Depending on the state of its addressing signal, each pixel tilts so that it either does or does not reflect light to the image plane.

Generally, projecting an image from an array of pixels is accomplished by loading memory cells connected to the pixels. Once each memory cell is loaded, the corresponding pixels are reset so that each one tilts in accordance with the ON or OFF state of the data in the memory cell. For example, to produce a bright spot in the projected image, the state of the pixel may be ON, such that the light from that pixel is directed out of the SLM and into a projection lens. Conversely, to produce a dark spot in the projected image, the state of the pixel may be OFF, such that the light is directed away from the projection lens.

To achieve intermediate levels of illumination, between white (ON) and black (OFF), pulse-width modulation (PWM) techniques may be employed. The basic PWM scheme involves first determining the rate at which images are to be presented to the viewer. This establishes a frame rate and a corresponding frame-time or frame period. For example, in many modern television systems images are transmitted at 60 frames per second (i.e., 60 Hz), and each frame lasts for approximately 16.67 milliseconds. Then, the intensity resolution for each pixel is established. In a simple example, and assuming n bits of resolution, the frame-time is divided into $2^n-1$ equal time slices. For a 16.67-millisecond frame period and n-bit intensity values, the time slice is $16.67/(2^n-1)$ milliseconds.

Having established these times, for each frame of the desired image pixel intensities are quantized, such that black is zero time slices. The LSB is the least amount of illumination intensity from the DMD and is one time slice, while maximum brightness, e.g., the most significant bit (MSB), is $2^{n-1}$ time slices. Each pixel's quantified intensity determines its on-time during a frame period. Thus, during a frame period, each pixel with a quantized value of more than zero is ON for the number of time slices that correspond to its intensity. The viewer's eye integrates the pixel brightness so that the image appears as if it were generated with analog levels of light.

For generating color images with SLMs, one approach is to use three DMDs, e.g., one for each primary color of red, green and blue (RGB). The light from corresponding pixels of each DMD is converged so that the viewer perceives the desired color. Another approach is to use a single DMD and a color wheel having sections of primary colors. Data for different colors is sequenced and synchronized to the color wheel so that the eye integrates sequential images into a continuous color image. Another approach uses two DMDs, with one switching between two colors and the other displaying a third color. Of course, other approaches are also being employed.

For addressing SLMs, PWM calls for the data to be formatted into "bit-planes," each bit-plane corresponding to bit-weights of intensity values. Thus, if each pixel's intensity is represented by an n-bit value, each frame of data has n bit-planes. Each bit-plane has a 0 or 1 value for each display element. In the simple PWM example described above, during a frame period, each bit-plane is separately loaded and the pixels are addressed according to their associated bit-plane values. For example, the bit-plane representing the LSBs of each pixel is displayed for one time slice, whereas the bit-plane representing the MSBs is displayed for $2^{n-1}$ time slices.

U.S. Pat. No. 5,278,652, entitled "DMD Architecture and Timing for Use in a Pulse-Width Modulated Display System," which is commonly assigned with this disclosure and incorporated hereby by reference, describes PWM for addressing a DMD in a DMD-based display system. It is directed to "global reset" methods, where bit-plane data is loaded during the preceding display time of another bit-plane. To begin the display time, the pixels of the entire array are reset simultaneously. Another method of SLM addressing is "divided" or "phased" reset addressing. With this approach, the pixels are divided into groups, but each pixel has its own memory cell. After the memory cells of one group are loaded with their data from a bit-plane, memory cells of a next group are loaded with their data. This continues until all groups have been loaded with data for the same bit-plane. Such "phased" loading is followed by a "phased reset" so that all groups consecutively begin their display of the bit-plane. Such a method is described in U.S. Pat. No. 6,201,521, entitled "Divided Reset for Addressing Spatial Light Modulator," which is commonly assigned with this disclosure and incorporated hereby by reference in its entirety.

Unfortunately, when phased reset techniques are employed to operate the pixels in distinct groups, "reset conflicts" often happen. A reset conflict occurs when reset signals in any two or more groups of pixels overlap in time. The complexity and often less-than-perfect results of resolving reset conflicts always limited the number of intensity levels attainable by the pixels and hence the overall image quality of the system.

What is needed in the art is a way to improve the image quality of a DMD. More specifically, what is needed in the art is a better way to resolve reset conflicts.

SUMMARY OF THE INVENTION

To address the above-discussed deficiencies of the prior art, the invention provides, in one aspect, a system for resolving reset conflicts in a phased-reset SLM system. In one embodiment, the system includes a reset conflict arbiter configured to receive reset instructions containing conflicts from a sequence generator and resolve the conflicts by shifting an execution time of selected ones of the reset instructions according to a conflict resolution method.

In another aspect, the invention provides a method of resolving reset conflicts in a phased-reset SLM system. In one embodiment, the method includes: (1) generating reset instructions having at least one conflict, (2) identifying the at least one conflict and (3) shifting an execution time of a selected one of the reset instructions according to a conflict resolution method to achieve a resolution of the at least one conflict.

In another aspect, the invention provides a projection visual display system. In one embodiment, the projection visual display system includes: (1) an SLM including a DMD configured to generate real-time images from an input signal, (2) a sequence generator coupled to the DMD, (3) a DMD reset waveform controller coupled to the DMD and (4) a reset conflict arbiter coupled between the sequence generator and the DMD reset waveform controller and configured to receive reset instructions containing conflicts from the sequence generator, resolve the conflicts by shifting an execution time of selected ones of the reset instructions according to a conflict resolution method and transmit the reset instructions, free of the conflicts, to the DMD reset waveform controller.

The foregoing has outlined preferred and alternative features of the invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
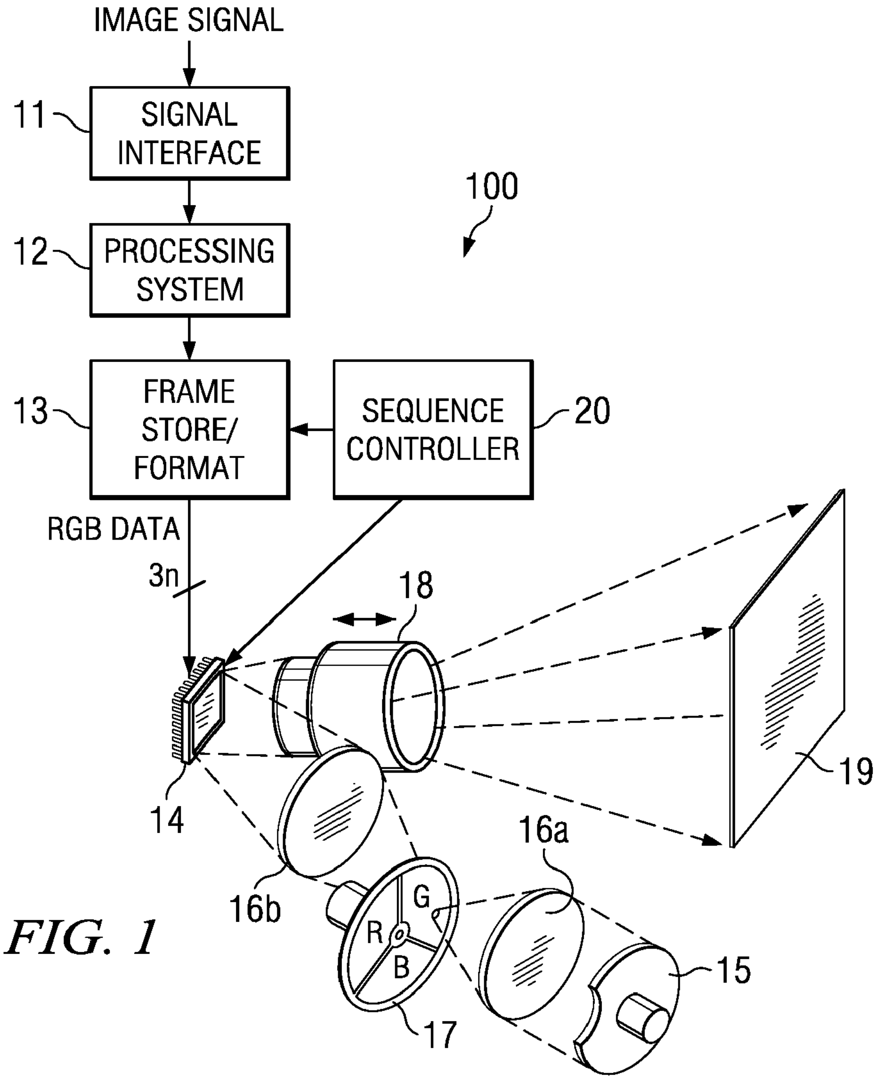
FIG. 1 illustrates one embodiment of a projection visual display system employing an SLM having a DMD therein to generate real-time images from an input signal.

Referring initially to FIG. 1, illustrated is one embodiment of a projection visual display system 100, which uses an SLM having a DMD 14 therein to generate real-time images from an input signal. The input image signal may be from a television tuner, Motion Picture Experts Group (MPEG) decoder, video disc player, video cassette player, PC graphics card or the like. Only those components significant to main-screen pixel data processing are shown. Other components, such as might be used for processing synchronization and audio signals or secondary screen features, such as closed captioning, are not shown for simplicity.

A white light source 15 shines white light through a concentrating lens **16*a*, a color wheel 17 and a collimating lens 16*b*. The light, now being colored as a function of the position of the color wheel 17, reflects off a DMD 16 and through a lens 18 to form an image on a screen 19**.

In the illustrated embodiment, an input image signal, which may be an analog or digital signal, is provided to a signal interface 11. In embodiments where the input signal is analog, an analog-to-digital converter (not illustrated) may be employed to convert the incoming signal to a digital data signal. The signal interface 11 receives the data signal and separates video, synchronization and audio signals. In addition, a Y/C separator is also typically employed, which converts the incoming data from the image signal into pixel-data samples, and which separates the luminance (Y) data from the chrominance (C) data, respectively. Alternatively, in other embodiments, Y/C separation could be performed before analog-to-digital (A/D) conversion.

The separated signals are then provided to a processing system 12. The processing system 12 prepares the data for display, by performing various pixel data processing tasks. The processing system 12 may include whatever processing components and memory useful for such tasks, such as field and line buffers. The tasks performed by the processing system 12 may include linearization (to compensate for gamma correction), colorspace conversion, and interlace to progressive scan conversion. The order in which any or all of the tasks performed by the processing system 12 may vary.

Once the processing system 12 is finished with the data, a frame store/format module 13 receives processed pixel data from the processing system 12. The frame store/format module 13 formats the data, on input or on output, into bit-plane format and delivers the bit-planes to the DMD 14. The bit-plane format permits single or multiple pixels on the DMD 14 to be turned on or off in response to the value of one bit of data, in order to generate one layer of the final display image. In one embodiment, the frame store/format module 13 is a "double buffer" memory, which means that it has a capacity for at least two display frames. In such a module, the buffer for one display frame may be read out to the SLM while the buffer for another display frame is being written. To this end, the two buffers are typically controlled in a "ping-pong" manner so that data is continually available to the SLM.

For the next step in generating the final desired image, the bit-plane data from the frame store/format module 13 is delivered to the SLM. Although this description is in terms of an SLM having a DMD 14 (as illustrated), other types of SLMs could be substituted into the display system 100. Details of a suitable SLM are set out in U.S. Pat. No. 4,956,619, entitled "Spatial Light Modulator," which is commonly owned with this disclosure and incorporated herein by reference in its entirety. In the case of the illustrated DMD-type SLM, each piece of the final image is generated by one or more pixels of the DMD 14, as described above. Generally, the SLM uses the data from the frame store/format module 13 to address each pixel on the DMD 14. The "ON" or "OFF" state of each pixel forms a black or white piece of the final image, and an array of pixels on the DMD 14 is used to generate an entire image frame. Each pixel displays data from each bit-plane for a duration proportional to each bit's PWM weighting, which is proportional to the length of time each pixel is ON, and thus its intensity in displaying the image. In the illustrated embodiment, each pixel of the DMD 14 has an associated memory cell to store its instruction bit from a particular bit-plane.

For each frame of the image to be displayed in color, red, green, blue (RGB) data may be provided to the DMD 14 one color at a time, such that each frame of data is divided into red, blue and green data segments. Typically, the display time for each segment is synchronized to an optical filter, such as the color wheel 17, which rotates so that the DMD 14 displays the data for each color through the color wheel 17 at the proper time. Thus, the data channels for each color are time-multiplexed so that each frame has sequential data for the different colors.

In an alternative embodiment, the bit-planes for different colors could be concurrently displayed using multiple SLMs, one for each color component. The multiple color displays may then be combined to create the final display image on the screen 19. Of course, a system or method employing the principles disclosed herein is not limited to either embodiment.

Also illustrated in FIG. 1 is a sequence controller 20 associated with the frame store/format module 13 and the DMD 14. The sequence controller 20 provides reset control signals to the DMD 14, as well as load control signals to the frame store/format module 13. These signals are typically ordered in a sequence generated in accordance with the principles disclosed below. An example of a suitable sequence controller is described in U.S. Pat. No. 6,115,083, entitled "Load/Reset Sequence Controller for Spatial Light Modulator," which is commonly owned with this disclosure and incorporated herein by reference in its entirety.

Figure 2:
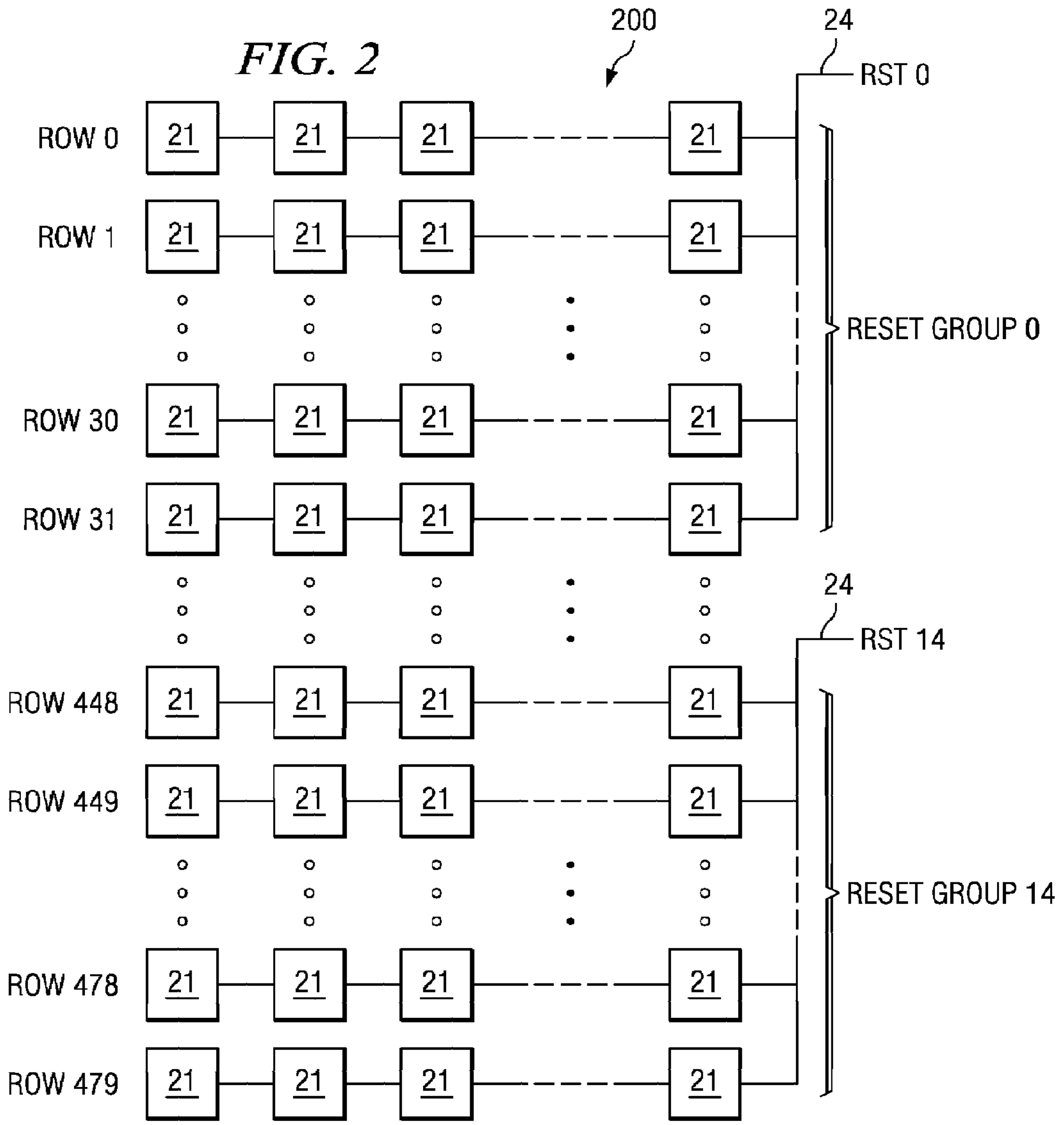
FIG. 2 illustrates a portion of the array of micro-mirrors found on DMD of FIG. 1.

Turning now to FIG. 2, illustrated is a portion of the array 200 of micro-mirrors (i.e., "pixels") 21 found on the DMD 14 of FIG. 1. In the illustrated embodiment, the array 200 are configured for divided or "phased" reset addressing. As explained below, addressing the pixels 21 typically requires that each of the memory cell associated with the pixels 21 be loaded with data derived from bit sequences for each bit-plane of the desired image, and that each of the pixels 21 be reset between loads to operate the pixels 21 in accordance with that data. When operated, the pixels 21 display the data by being ON or OFF for a display time that corresponds to the intensity of light that each of the pixels 21 generates.

Although only a small number of pixels 21 are illustrated in FIG. 2, the DMD 14 typically has additional rows and columns of pixels 21, as indicated by ellipses. The mirror array 200 of a typical DMD 14 has hundreds or even thousands of display pixels 21, each usually with its own memory cell. As shown, the array 200 may be divided into "reset groups" of pixels 21, which are defined by which pixels 21 are connected to a single reset line 24. In the example of FIG. 2, each thirty-two consecutive rows of pixels 21 are connected to a single reset line 24, and are thus a separate group. For example, if a 480-row DMD 14 has thirty-two rows per group, as is illustrated, fifteen groups of pixels 21 result. The bit-plane data for each of the groups is formatted into group data. Thus, where p is the number of active pixels 21 on the DMD 14 and q is the number of groups, a bit-plane having p number of bits is formatted into q groups of data. Therefore, each group of pixels 21 has p/q bits of data.

In many embodiments, the number of groups into which a mirror array 200 is arranged is somewhat arbitrary. In general, the minimum bit-plane display time is inversely proportional to the number of groups. On one hand, shorter bit-times are often desirable because they allow better flexibility for mitigating visual artifacts. However, on the other hand, overall complexity of the display system increases with more groups because of the need for additional drive circuits, package pins, and control circuitry. In general, however, the principles described herein apply to a DMD 14 having any number of groups. Moreover, the rows in each group need not be consecutive, and any pattern is possible, such as an interleaved pattern of every $n^{th}$ row for n number of reset lines. Furthermore, the pattern could be in vertical or diagonal rows, and the pattern need not be row-by-row, but rather in blocks, contiguous or interleaved.

Figure 3:
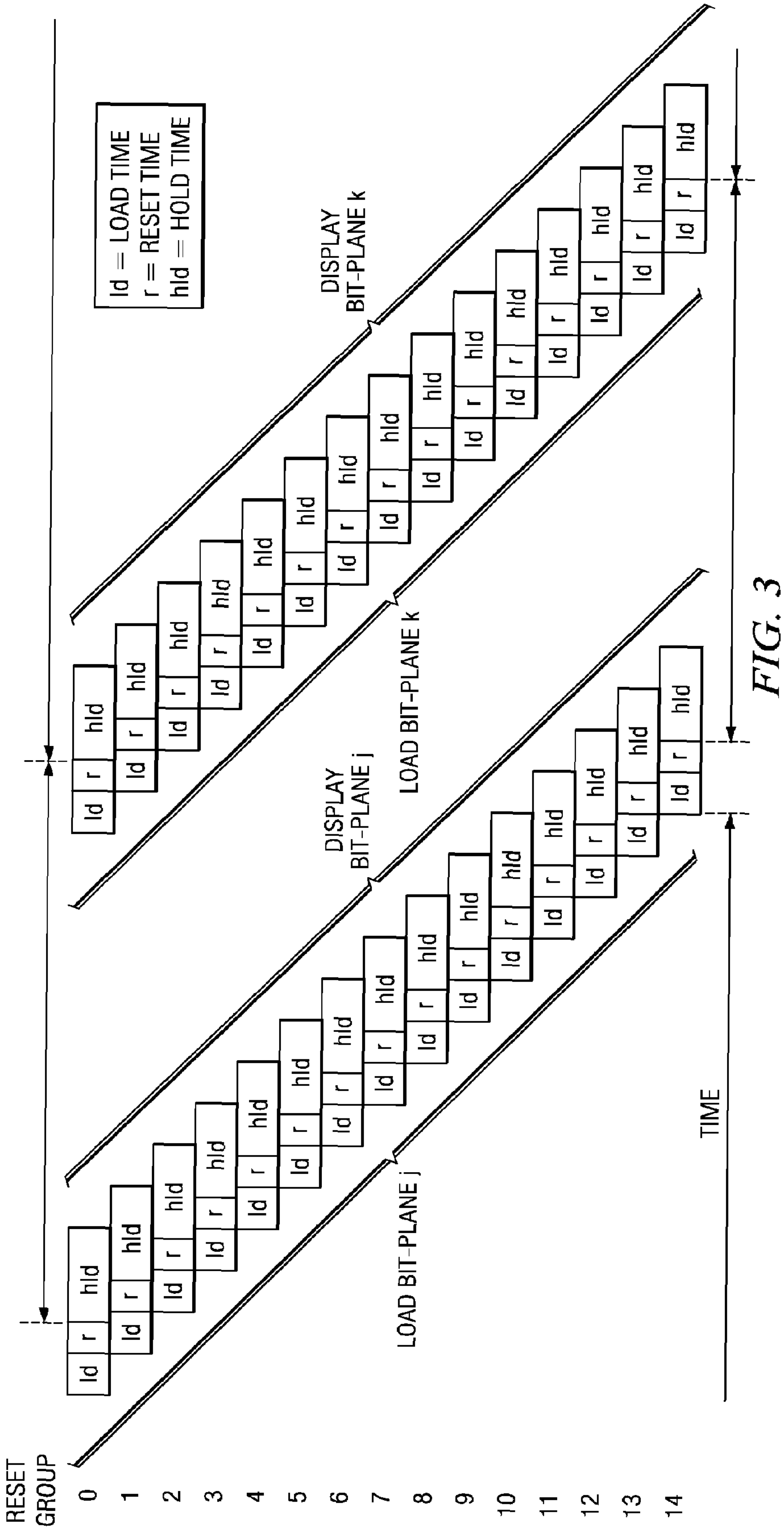
FIG. 3 illustrates an example of phased resetting using the fifteen groups of pixels shown in FIG. 2.

Turning now to FIG. 3, illustrated is an example of phased resetting using the fifteen groups of pixels 21 shown in FIG. 2. More specifically, the fifteen groups of pixels 21 are loaded and reset for displaying of a bit-plane "j." Each group is first loaded with data, during a load-time (ld). Then, the pixels 21 for each loaded group are reset. The reset time (r) represents the time when a reset signal is applied on the reset line connected to each particular group. The reset signal causes each pixel 21 in the group to change state in accordance with the data stored in its memory cell. After being reset, the group begins its display time, where at the beginning of the display time, the pixels 21 undergo a hold-time ("hld") during which the data should be kept stable.

As soon as one group is loaded, loading of the next group may begin. Such loading, resetting and displaying process is repeated for each of the fifteen groups, such that after each group is loaded, the loading of the next group begins while the previous group is being reset and displayed. In the embodiment in FIG. 3, the load and reset for each group occurs consecutively, resulting in a phased reset, as distinguished from a "global" reset where all of the groups are reset concurrently once each has been loaded. By employing a phased reset, the display times of the groups for the bit-plane are skewed at the beginning and end of the display time. However, the viewer perceives each pixel's ON-time as if all pixels were on simultaneously for the bit-time.

In this embodiment, the reset of each group occurs immediately after the loading of that group. As a result, the display time is as long as the total time to load all groups, typically referred to a "nominal" display time. In the particular example of FIG. 3, the display time for bit-plane j is the same as the time to load all fifteen groups, e.g., from the reset of Group 0 to the reset of Group 14. Of course, a nominal display time is not required and the time between load and reset may be delayed for each reset group, which provides shorter display times. Alternatively, loading may be non-continuous, which provides longer display times. Also, the time between load and reset need not be the same among reset groups, which makes it possible to align the resets rather than skew them at the beginning of a bit-plane display time.

For load/reset sequence generation, a sequence controller, such as the controller 18 described above, is programmed with a sequence of loads and reset instructions. The "sequence" is the particular order, for a frame period, of loads and resets for all the groups. For example, relative to time 0, a portion of a reset sequence might include the following two instructions:

reset [170,1]

reset [16,2]

where the argument is [delay, group number]. A portion of a load sequence might include the following two instructions:

load [300,5]

load [198,6]

where the argument is [delay, bit-plane number]. Usually, a load of a bit-plane occurs without interruption for all groups. In such an embodiment, no group designations are necessary, it being implied that a load instruction is for a continuous series of all groups. However, the loads of groups for a bit-plane may also be independently initiated.

The reset sequence and the load sequence are coordinated with each other so that loads and resets occur at the proper times. In the above examples of reset and load sequences, the delays are from a common reference. The sequence programmed into the sequence controller 20 is the result of a sequence generation process discussed in several of the references cited above. A computer that is programmed in accordance with the principles disclosed herein typically performs such a sequence generation process. A "sequence generator" may be implemented in a general-purpose or dedicated computer, an embedded microprocessor, or one or more dedicated application-specific integrated circuits (ASICs) or field-programmable gate arrays (FPGAs).

Figure 4:
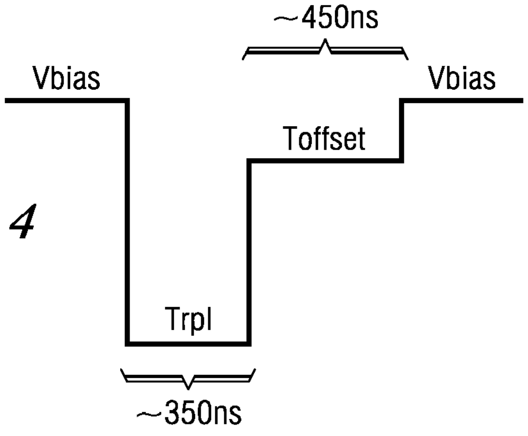
FIG. 4 illustrates an example of a reset waveform with which the system or method of the invention may operate.

FIG. 4 illustrates an example of a reset waveform with which the system or method of the invention may operate. The waveform has two principal portions: Trpl ("rpl" is "reset pulse length") and Toffset ("offset" is "offset pulse length") In the example, Trpl has a nominal duration of about 350 ns, and Toffset has a nominal duration of about 450 ns. Those skilled in the pertinent art will understand, however, that the invention is not limited to a particular configuration, duration or amplitude of reset waveform.

Figure 5:
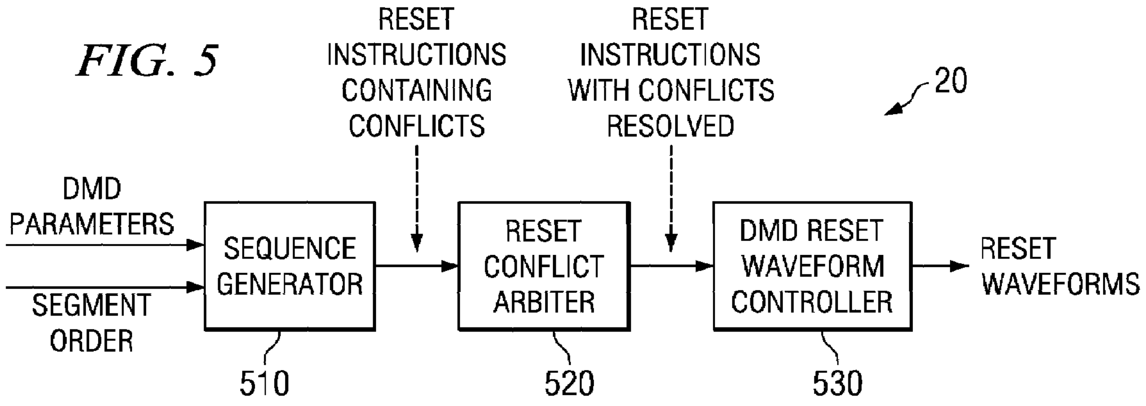
FIG. 5 illustrates a block diagram of one embodiment of a sequence controller embodying a system for resolving reset conflicts in phased-reset SLM systems constructed according to the principles of the invention.

Referring now to FIG. 5, illustrated is a block diagram of one embodiment of the sequence controller 20 of FIG. 1. The sequence controller 20 embodies a system for resolving reset conflicts in phased-reset SLM systems constructed according to the principles of the invention.

The sequence controller 20 includes a sequence generator 510. The sequence generator 510 generates a sequence of resets and loads and their initial timing. To generate valid loads and resets, the sequence generator 510 takes into consideration certain incoming data and classifies segments. The output of the sequence generator 510 is a stream of reset and load instructions. At least some of the reset instructions ostensibly contain conflicts. Conventionally, the stream of reset instructions is provided directly to a DMD reset waveform controller 530 and hence too late for conventional software-based resolution techniques to intervene. Thus, the conflicts would propagate to the DMD reset waveform controller 530, where they are transformed into reset waveforms that, if applied to the DMD, could cause serious errors in DMD operation. In contrast, the illustrated embodiment of the invention interjects a hardware-based reset conflict arbiter 520 between the sequence generator 510 and the DMD reset waveform controller 530. The reset conflict arbiter 520 identifies and resolves reset conflicts through arbitration. Thus, with the reset conflict arbiter 520 in place, the stream of reset instructions is relieved of conflicts.

Having described an example projection visual display system and the concept of phased resetting of a DMD therein, various reset conflict scenarios and resolutions will now be described. Due to load constraints, only two possible types of reset conflict scenarios are possible in the example system. They are as follows.

The first conflict scenario involves a conflict between two resets. The two conflicting resets are separated from neighboring resets by about a load time, so conflicts under this first scenario are isolated to the two resets. In the context of the disclosed projection visual display system, the first conflict scenario applies to short bits. In the discussion that follows, the first conflict scenario will be resolved in four contexts: (1) a general case in which instruction time resolution is infinite (time resolution is not limited apart from clock speed); (2) a first special case in which instruction resolution equals the minimum time required for edge separation, Δt, and the clock period that determines the reset waveform timing also equals to Δt; (3) a second special case in which reset instruction time resolution is 0.5 Δt, the minimum time required for edge separation is Δt, and the clock period that determines the reset waveform timing is 0.5 Δt; and (4) a third special case in which a simplified resolution scheme is used for any clock resolution at the expense of a larger resultant error.

The second conflict scenario involves a conflict among three resets. The three conflicting resets are separated from neighboring resets by about a load time, so conflicts under this second scenario are isolated to the three resets. In the context of the disclosed projection visual display system, the second conflict scenario applies to fast clear bits. In the discussion that follows, the second conflict scenario will be resolved in two different ways. While both resolution methods fall within the scope of the invention, the first one of the two is preferred in the context of the disclosed projection visual display system.

A Reset Conflict Resolution Method Under the First Scenario—A General Case for Infinite Time Resolution For the purposes of this discussion, the two resets are called "rstb tn" and "rstb tn+1," where tn and tn+1 are the start time of each reset waveform and tn+1>tn. Let Tn=tn+1−tn. All reset waveforms are assumed be identical. It is assumed that Toffset >Trpl+2*Δt. Δt is assumed to be the minimum time required for edge separation but is not held to a particular minimum value (subject, of course, to clock speed).

Figure 6:
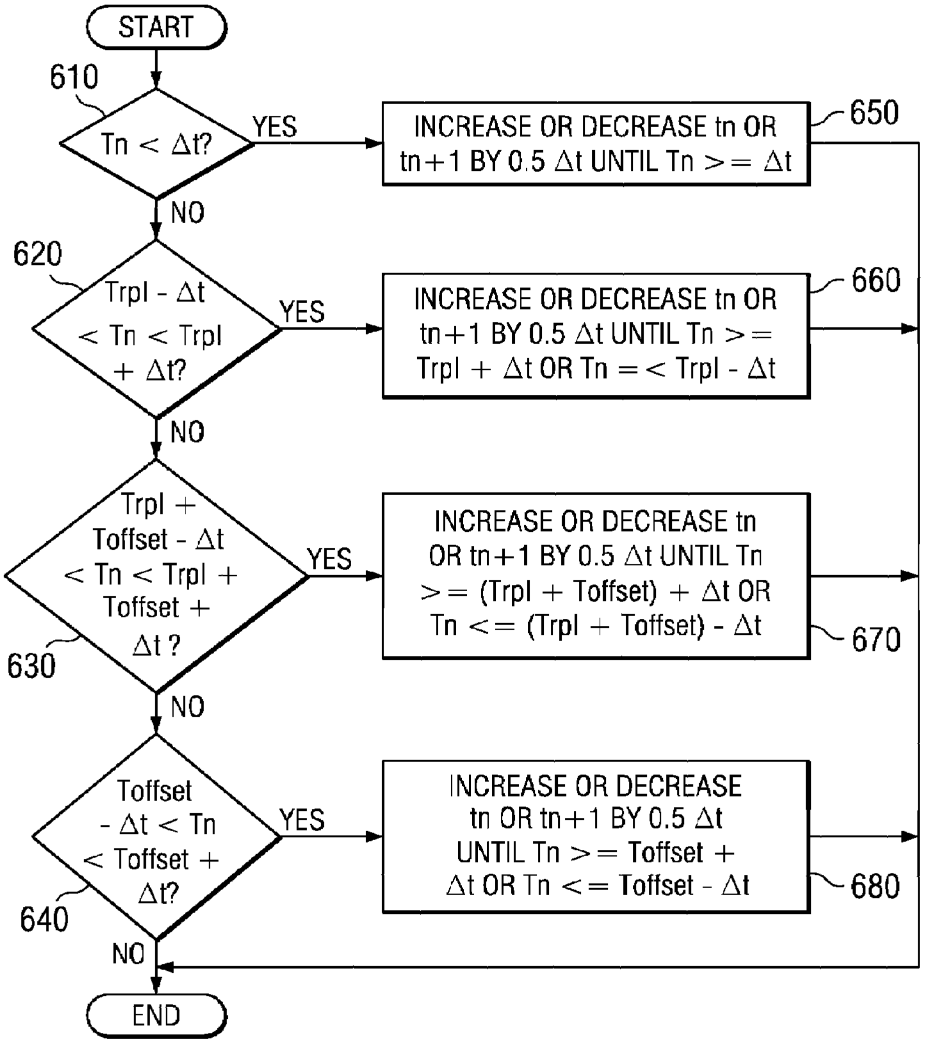
FIG. 6 illustrates a flow diagram of one embodiment of a method of resolving reset conflicts between two resets in phased-reset SLM systems assuming an infinite time resolution and carried out according to the principles of the invention.

FIG. 6 illustrates a flow diagram of one embodiment of a method of resolving reset conflicts between two resets in phased-reset SLM systems assuming an infinite time resolution and carried out according to the principles of the invention. An edge conflict exists if:

(1) $Tn<\Delta t$ (determined in a decisional step 610), or (2) $Trpl-\Delta t<Tn<Trpl+\Delta t$ (determined in a decisional step 620), or (3) $(Trpl+Toffset)-\Delta t<Tn<(Trpl+Toffset)+\Delta t$ (determined in a decisional step 630), or (4) $Toffset-\Delta t<Tn<Toffset+\Delta t$ (determined in a decisional step 640).

The method resolves these edge conflicts respectively by the following steps:

(1) In a step 650, tn or tn+1 is increased or decreased (whichever results in the least change) until $Tn>=\Delta t$.

(2) In a step 660, tn or tn+1 is increased or decreased (whichever results in the least change) until $Tn>=Trpl+\Delta t$, or $Tn=<Trpl-\Delta t$.

(3) In a step 670, tn or tn+1 is increased or decreased (whichever results in the least change) until $Tn>=(Trpl+Toffset)+\Delta t$, or $Tn<=(Trpl+Toffset)-\Delta t$.

(4) In a step 680, tn or tn+1 is increased or decreased (whichever results in the least change) until $Tn>=Toffset+\Delta t$, or $Tn<=Toffset-\Delta t$.

Figure 7:
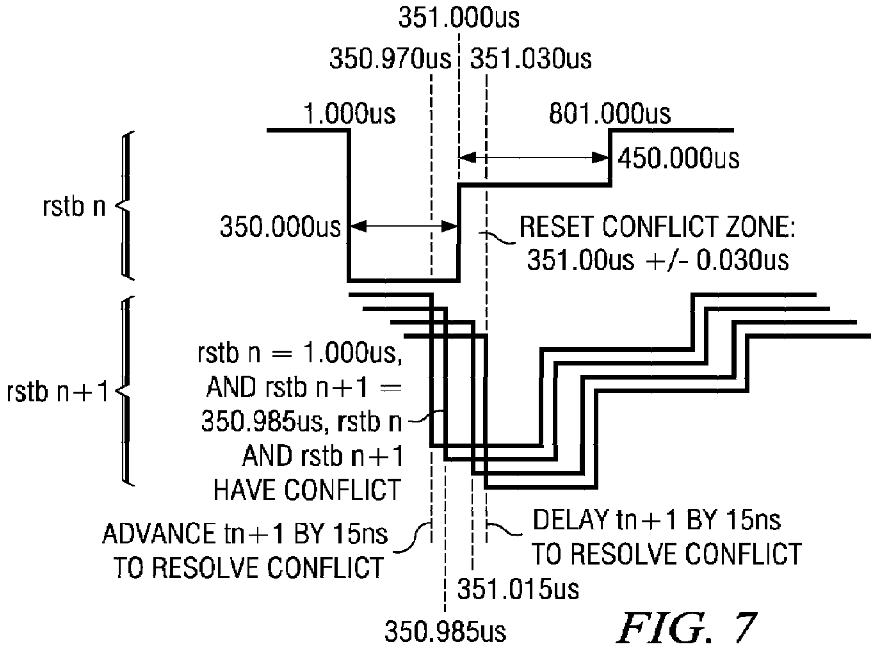
FIG. 7 is a graph illustrating a resolution of a conflict between two resets according to the method of FIG. 6.

FIG. 7 is a graph illustrating the resolution of the conflict between two resets according to the method of FIG. 6. The maximum error caused by reset conflict resolution is Δt.

A Reset Conflict Resolution Method Under the First Scenario—A First Special Case In this first special case, instruction resolution equals the minimum time required for edge separation, Δt, and the clock period that determines the reset waveform timing also equals to Δt. As a result, the conflict determination and resolution algorithms can be simplified. For the purposes of this discussion, the two resets are called "rstb tn" and "rstb tn+1," where tn and tn+1 are the start time of each reset waveform and tn+1>tn. Both tn and tn+1 are quantized to a resolution of Δt. All reset waveforms are assumed be identical. It is assumed that $Toffset>Trpl+2*\Delta t$. Δt is assumed to be the minimum time required for edge separation.

Figure 8:
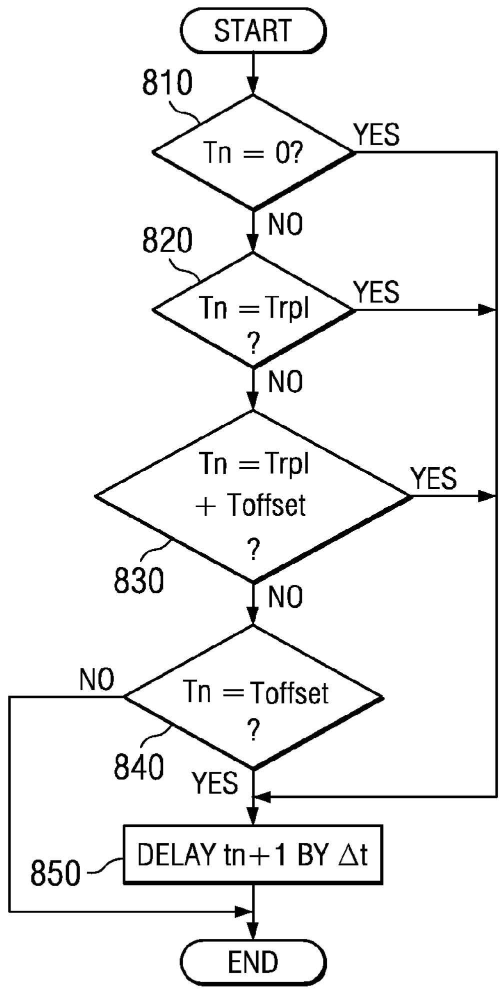
FIG. 8 illustrates a flow diagram of one embodiment of a method of resolving reset conflicts carried out according to the principles of the invention when instruction resolution equals the minimum time required for edge separation, Δt, and the clock period that determines the reset waveform timing also equals to Δt.

FIG. 8 illustrates a flow diagram of one embodiment of a method of resolving reset conflicts between two resets in phased-reset SLM systems assuming a 30 ns reset instruction time resolution and carried out according to the principles of the invention. An edge conflict exists if:

(1) Tn=0 (determined in a decisional step 810), or (2) Tn=Trpl (determined in a decisional step 820), or (3) Tn=Trpl+Toffset (determined in a decisional step 830), or (4) Tn=Toffset (determined in a decisional step 840).

The method resolves these conflicts by the following step:

In a step 850, delay (increase in time) tn+1 by Δt.

Figure 9:
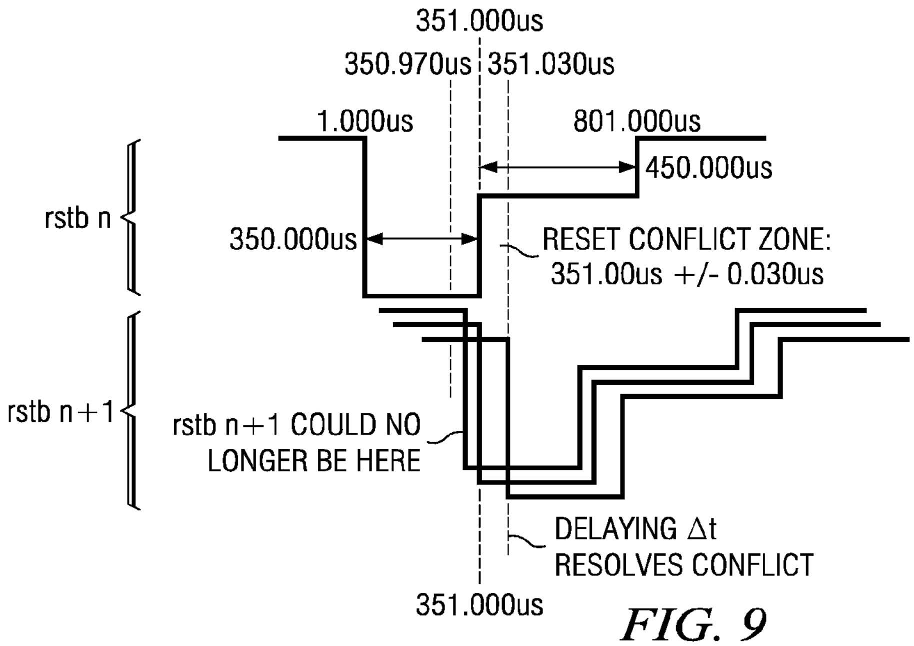
FIG. 9 is a graph illustrating a resolution of a conflict between two resets according to the method of FIG. 8.

FIG. 9 is a graph illustrating the resolution of the conflict between two resets according to the method of FIG. 8. The maximum error caused by reset conflict resolution is Δt. The maximum error caused by quantization to tn and/or tn+1 is ±0.5 Δt. The maximum total error in each bit segment is 2 Δt. This is because, if rstb t10 gets reduced by 0.5 Δt, rstb t11 gets increased by 0.5 Δt and reset conflict resolution further delays rstb t11 by Δt, the bit segment determined by rstb t10 and rstb t11 is lengthened by 2 Δt. If Δt=30 ns, the maximum potential error in each bit segment as the result of using this method is 60 ns.

A Reset Conflict Resolution Method Under the First Scenario—A Second Special Case In this second special case, reset instruction time resolution is 0.5 Δt, the minimum time required for edge separation is Δt, and the clock period that determines the reset waveform timing is 0.5 Δt. As a result, the resolution algorithm can be simplified. For the purposes of this discussion, the two resets are called "rstb tn" and "rstb tn+1," where tn and tn+1 are the start time of each reset waveform and tn+1>tn. Both tn and tn+1 are quantized to a resolution of 0.5 Δt. All reset waveforms are assumed be identical. It is assumed that $Toffset>Trpl+2.5\ \Delta t$. Δt is assumed to be the minimum time required for edge separation.

Figure 10:
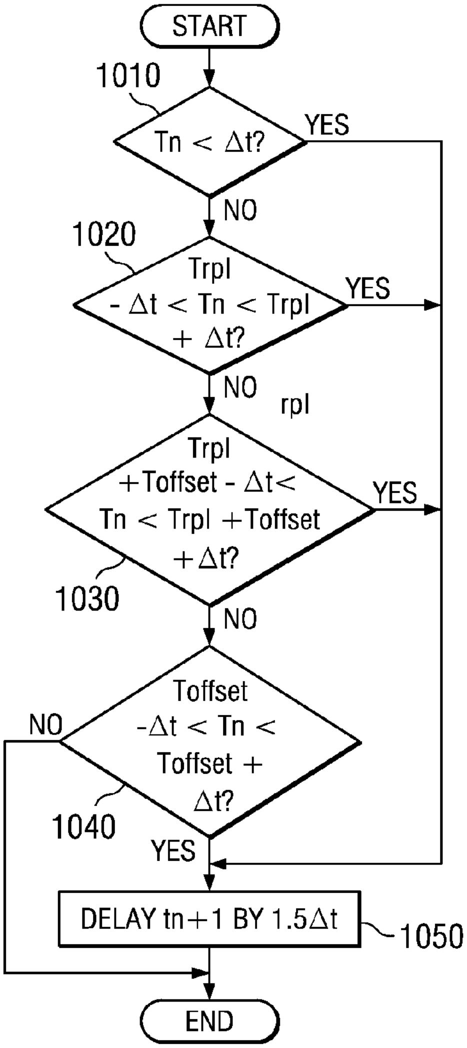
FIG. 10 illustrates a flow diagram of one embodiment of a method of resolving reset conflicts carried out according to the principles of the invention when reset instruction time resolution is 0.5 Δt, the minimum time required for edge separation is Δt, and the clock period that determines the reset waveform timing is 0.5 Δt.

FIG. 10 illustrates a flow diagram of one embodiment of a method of resolving reset conflicts between two resets in phased-reset SLM systems assuming a 0.5 Δt reset instruction time resolution and carried out according to the principles of the invention. An edge conflict exists if:

(1) $Tn<\Delta t$ (determined in a decisional step 1010), or (2) $Trpl-\Delta t<Tn<Trpl+\Delta t$ (determined in a decisional step 1020), or (3) $(Trpl+Toffset)-\Delta t<Tn<(Trpl+Toffset)+\Delta t$ (determined in a decisional step 1030), or (4) $Toffset-\Delta t<Tn<Toffset+\Delta t$ (determined in a decisional step 1040).

The method resolves these conflicts by the following step:

In a step 1050, once a conflict is detected, delay (increase in time) tn+1 by 1.5 Δt.

Figure 11:
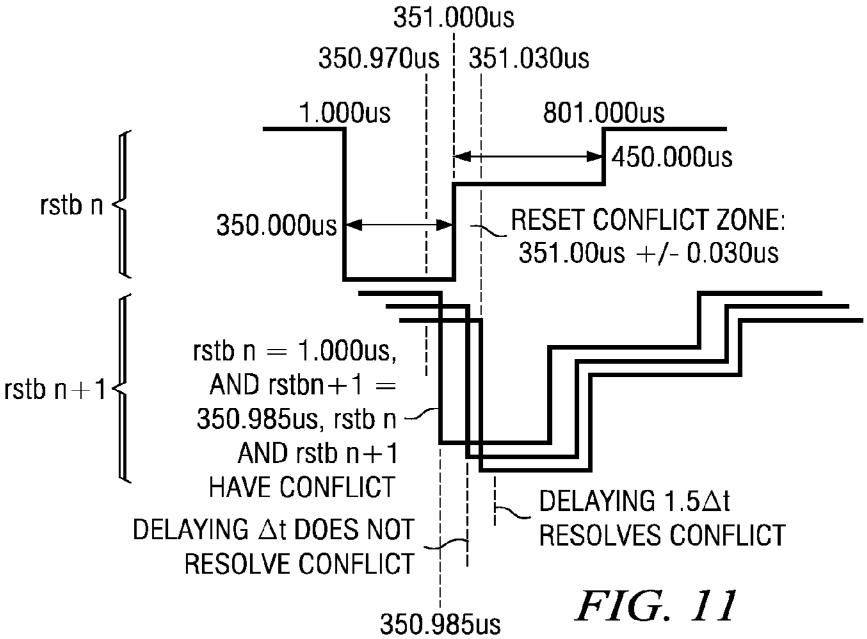
FIG. 11 is a graph illustrating a resolution of a conflict between two resets according to the method of FIG. 10.

FIG. 11 is a graph illustrating the resolution of the conflict between two resets according to the method of FIG. 10. The maximum error caused by reset conflict resolution is 1.5 Δt. The maximum error caused by quantization to tn and/or tn+1 is ±0.25 Δt. The maximum total error in each bit segment is 2.5 Δt. This is because, if rstb t10 gets reduced by 0.25 Δt, rstb t11 gets increased by 0.5 Δt and reset conflict resolution further delays rstb t11 by 1.5 Δt, the bit segment determined by rstb t10 and rstb t11 is lengthened by 2 Δt. It should be noted that the method of FIG. 6 results in a lower maximum error than the method of FIG. 10 when the reset instruction time resolution is 0.5 Δt. Thus, the method of FIG. 6 may be preferred under such circumstances if less error is considered more important than simplicity of the resolution.

A Simplified Reset Conflict Resolution Method Under the First Scenario—A Third Special Case In the first special case, a simplified method is also possible. For the purposes of this discussion, the two resets are called "rstb tn" and "rstb tn+1," where tn and tn+1 are the start time of each reset waveform and tn+1>tn. Let Tn=tn+1−tn. All reset waveforms are assumed be identical. It is assumed that $Toffset>Trpl+2*\Delta t$. Δt is assumed to be the minimum time required for edge separation but is not held to a particular minimum value (subject, of course, to clock speed).

Figure 12:
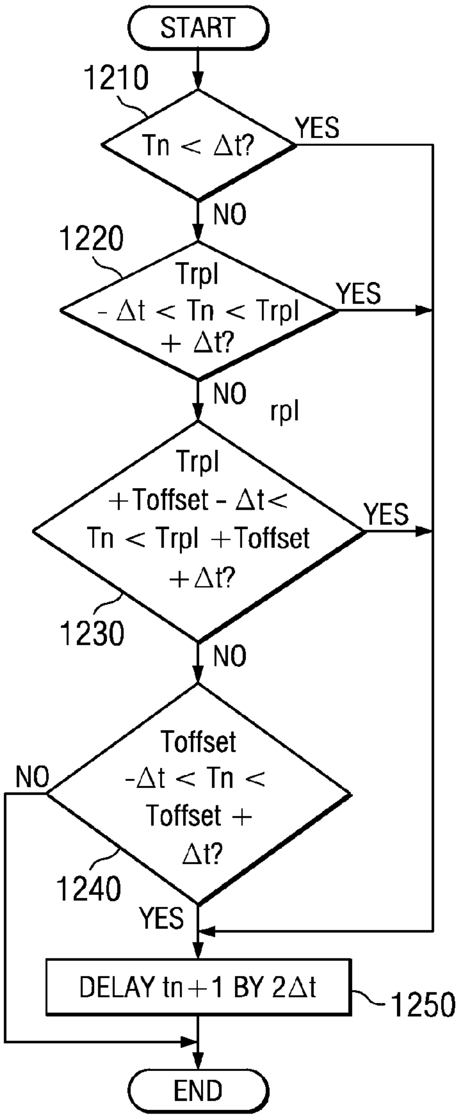
FIG. 12 illustrates a flow diagram of one embodiment of a method of resolving reset conflicts between two resets in phased-reset SLM systems assuming a 0.5 Δt reset instruction time resolution and carried out according to the principles of the invention.

FIG. 12 illustrates a flow diagram of one embodiment of a method of resolving reset conflicts between two resets in phased-reset SLM systems assuming a 0.5 Δt reset instruction time resolution and carried out according to the principles of the invention. An edge conflict exists if:

(1) $Tn<\Delta t$ (determined in a decisional step 1210), or (2) $Trpl-\Delta t<Tn<Trpl+\Delta t$ (determined in a decisional step 1220), or (3) $(Trpl+Toffset)-\Delta t<Tn<(Trpl+Toffset)+\Delta t$ (determined in a decisional step 1230), or (4) $Toffset-\Delta t<Tn<Toffset+\Delta t$ (determined in a decisional step 1230).

The method resolves these conflicts by the following step:

In a step 1250, once a conflict is detected, delay (increase in time) tn+1 by 2 Δt. The maximum error resulting from the resolution method is 2 Δt. It is necessary to assume $Toffset>Trpl+3*\Delta t$ and that $Trpl>3*\Delta t$. Δt could be any real positive value representing time in any unit.

Figure 13:
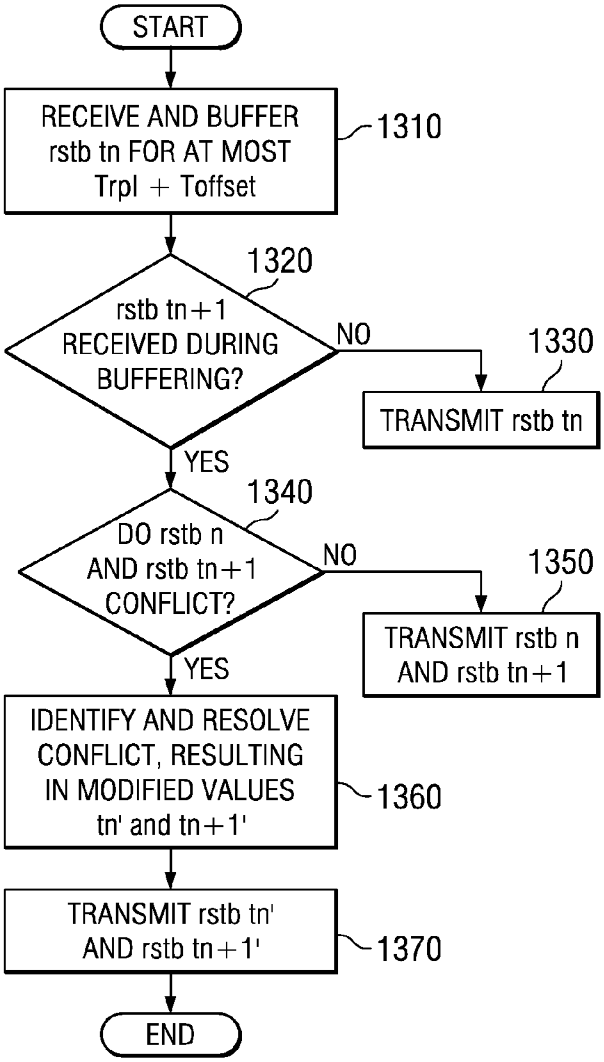
FIG. 13 illustrates a flow diagram of a method of receiving, resolving conflicts in and transmitting two resets carried out according to the principles of the invention.

FIG. 13 illustrates a flow diagram of a method of receiving, resolving conflicts in and transmitting two resets carried out according to the principles of the invention. In the illustrated embodiment, the method is carried out in the reset conflict arbiter 520 of FIG. 5 and includes one or more of the methods of FIGS. 6, 8, 10 and 12, depending upon reset instruction time resolution.

In a step 1310, the reset rstb tn is received and buffered for a period of time that is less than or equals Trpl+Toffset. In a decisional step 1320, it is determined whether a subsequent reset, rstb tn+1 has been received while rstb tn is being buffered. If not, rstb tn is transmitted to a DMD reset waveform controller (e.g., 530 of FIG. 5) in a step 1330. If so, in a decisional step 1340, it is determined whether rstb tn and rstb tn+1 conflict. If not, rstb tn and rstb tn+1 are transmitted to the DMD reset waveform controller in a step 1350. If so, the conflict is identified and resolved in a step 1360. Resolution may be in accordance with the methods of FIGS. 6, 8, 10 or 12, or any other suitable resolution method. Then, in a step 13270, rstb tn and rstb tn+1 are transmitted to the DMD reset waveform controller, the conflict having been resolved. The method returns to the step 1310, wherein a subsequent reset (e.g., rstb tn+2, which may be regarded as rstb tn) is received and buffered, and the remaining steps of the method are repeated.

A Reset Conflict Resolution Method Under the Second Scenario—A First Embodiment

In this first embodiment, positive identification of each reset type is required to minimize the resulted error. For the purposes of this discussion, the three resets are called "rstb tn," "rstb tn+1" and "rstb tn+2," where tn, tn+1 and tn+2 are the start time of each reset waveform and tn+2>tn+1>tn. All reset waveforms are assumed to be identical. It is assumed that Toffset>Trpl+3*Δt and that Trpl>3*Δt. Δt is assumed to be the minimum time required for edge separation.

A new name, rxtb, is given to the reset that initiates the dark segment in the fast clear bits. A new name, rx2*tb,* is given to the reset that terminates the dark segment in the fast clear bits. For fast clear bit, each reset group will consist three consecutive resets, rstb, rxtb, rx2*tb*. Conflicting resets will occur either in clusters of two or clusters of three resets. When in clusters of three, the conflicting resets will consists of rstb, rxtb, rx2*tb* in various orders.

Figure 14:
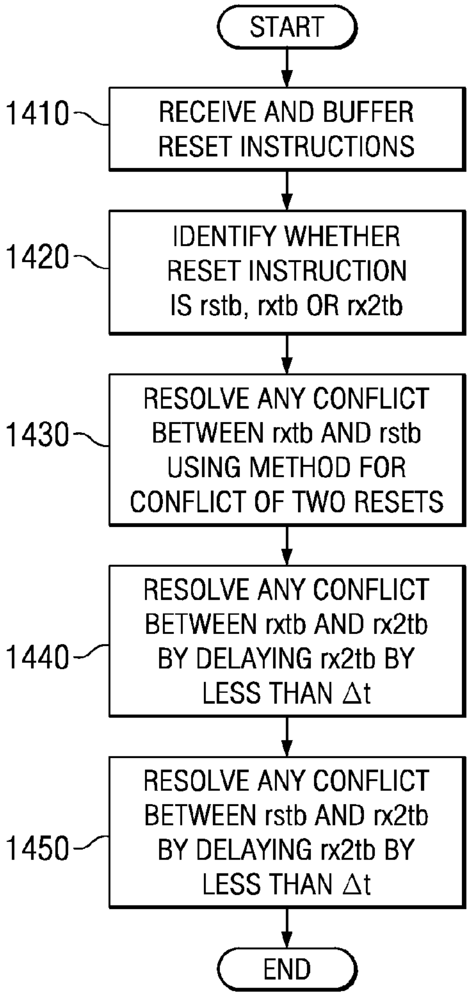
FIG. 14 illustrates a flow diagram of one embodiment of a method of resolving reset conflicts among three resets in phased-reset SLM systems carried out according to the principles of the invention.

FIG. 14 illustrates a flow diagram of the first embodiment of the method of resolving reset conflicts among three resets in phased-reset SLM systems carried out according to the principles of the invention. First, reset instructions are received and buffered in a step 1410. The conflict detection portion of the arbiter then determines whether a reset is rstb, or rxtb, or rx2*tb* in a step 1420. Once such identification is made, in a step 1430, any conflict between rxtb and rstb is resolved using one of the methods of FIGS. 6, 8, 10, 12, or another suitable resolution method for a conflict involving two resets.

In a step 1440, any conflict between rxtb and rx2*tb* is resolved by delaying rx2*tb* by less than Δt. In a step 1450, any conflict between rstb and rx2*tb* is resolved by delaying rx2*tb* by less than Δt. The accumulated maximum error in the fast clear bits is Δt. The accumulated maximum error in the dark segment is 2 Δt.

A Reset Conflict Resolution Method Under the Second Scenario—A Second Embodiment In this second embodiment, identification of each reset type is not required. All resets are treated as generic resets. In this case, the resolution algorithm is simplified because it does not need to identify the reset types. For the purposes of this discussion, the three resets are called "rstb tn," "rstb tn+1" and "rstb tn+2," where tn, tn+1 and tn+2 are the start time of each reset waveform and tn+2>tn+1>tn. All reset waveforms are assumed to be identical. It is assumed that Toffset>Trpl+3*Δt and that Trpl>3*Δt. Δt is assumed to be the minimum time required for edge separation.

Figure 15:
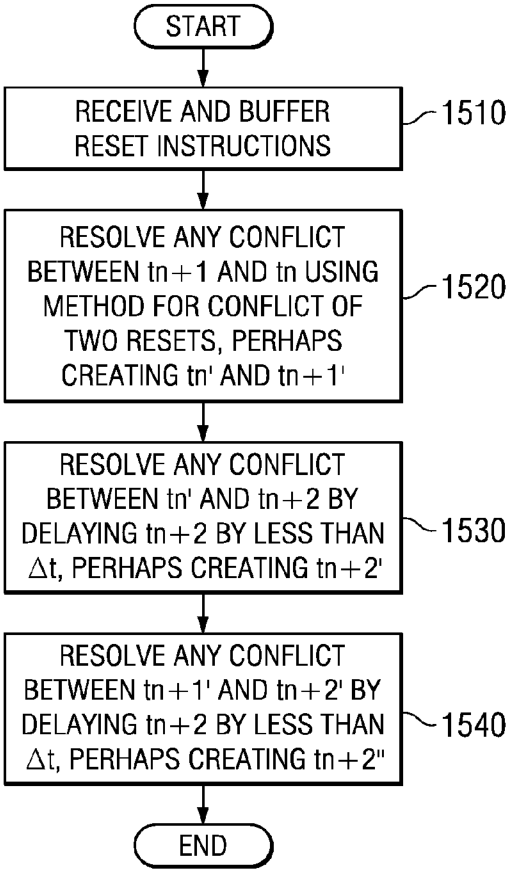
FIG. 15 illustrates a flow diagram of another embodiment of a method of resolving reset conflicts among three resets in phased-reset SLM systems carried out according to the principles of the invention.

FIG. 15 illustrates a flow diagram of the second embodiment of the method of resolving reset conflicts among three resets in phased-reset SLM systems carried out according to the principles of the invention. First, reset instructions are received and buffered in a step 1510. In a step 1520, any conflict between tn+1 and tn is resolved using one of the methods of FIGS. 6, 8, 10 and 12, or another suitable resolution method for a conflict involving two resets. The resulting times are noted as tn+1' and tn'

In a step 1520, any conflict between tn' and tn+2 is resolved by delaying tn+2 by less than or equal to Δt. In a step 1530, any conflict between tn+1' and tn+2' is resolved by delaying tn+2' by less than or equal to Δt. The accumulated maximum error in tn+2 is 2 Δt. As between the first and second embodiments of reset conflict resolution under the second scenario, the first embodiment is preferred if less error is valued more than the simplicity of the resolution device.

Implicit in both of the above-described first and second scenarios is that the minimum instruction resolution value is smaller than the minimum required edge separation time Δt. If the instruction resolution value is greater than the minimum required edge separation time Δt, the delay amounts used for conflict resolution should use the instruction resolution time instead of Δt.

Although the invention has been described in detail, those skilled in the pertinent art should understand that they can make various changes, substitutions and alterations herein without departing from the spirit and scope of the invention in its broadest form.

What is claimed is:

1. A system for resolving reset conflicts in a phased-reset SLM system, comprising:

a reset conflict arbiter configured to receive reset instructions containing conflicts from a sequence generator and resolve said conflicts by shifting an execution time of a selected one of said reset instructions according to a conflict resolution method.

2. The system as recited in claim 1 wherein one of said conflicts involves first and second reset instructions and said conflict resolution method includes shifting said execution time of a selected one of said first and second reset instructions by a fraction of a minimum edge separation time until execution times of said first and second reset instructions are separated by at least said minimum edge separation time.

3. The system as recited in claim 1 wherein one of said conflicts involves first and second reset instructions and said conflict resolution method includes shifting said execution time of a selected one of said first and second reset instructions by a fraction of a minimum edge separation time until execution times of said first and second reset instructions are separated by at least a reset pulse length time plus said minimum edge separation time or at most said reset pulse length time minus said minimum edge separation time.

4. The system as recited in claim 1 wherein one of said conflicts involves first and second reset instructions and said conflict resolution method includes shifting said execution time of a selected one of said first and second reset instructions by a fraction of a minimum edge separation time until execution times of said first and second reset instructions are separated by at least a reset pulse length time plus an offset pulse length time plus said minimum edge separation time or at most said reset pulse length time plus said offset pulse length time minus said minimum edge separation time.

5. The system as recited in claim 1 wherein one of said conflicts involves first and second reset instructions and said conflict resolution method includes shifting said execution time of a selected one of said first and second reset instructions by a fraction of a minimum edge separation time until execution times of said first and second reset instructions are separated by at least an offset pulse length time plus said minimum edge separation time or at most said offset pulse length time minus said minimum edge separation time.

6. The system as recited in claim 1 wherein one of said conflicts involves first and second reset instructions and said conflict resolution method includes delaying said second reset instruction by at least a fraction of a minimum edge separation time.

7. The system as recited in claim 6 wherein said conflict resolution method includes delaying said second reset instruction by an entirety of said minimum edge separation time.

8. The system as recited in claim 1 wherein one of said conflicts involves first, second and third reset instructions and said conflict resolution method includes shifting said execution time of a selected one of said first and second reset instructions by a fraction of a minimum edge separation time until execution times of said first and second reset instructions are separated by at least said minimum edge separation time and delaying an execution time of said third reset instruction by less than said minimum edge separation time with respect to said first and second reset instructions.

9. The system as recited in claim 1 wherein one of said conflicts involves first, second and third reset instructions and said conflict resolution method includes shifting said execution time of a selected one of said first and second reset instructions by a fraction of a minimum edge separation time until execution times of said first and second reset instructions are separated by at least said minimum edge separation time or at most a reset pulse length time minus said minimum edge separation time and delaying an execution time of said third reset instruction by less than said minimum edge separation time with respect to said first and second reset instructions.

10. The system as recited in claim 1 wherein one of said conflicts involves first, second and third reset instructions and said conflict resolution method includes shifting said execution time of a selected one of said first and second reset instructions by a fraction of a minimum edge separation time until execution times of said first and second reset instructions are separated by at least said minimum edge separation time and delaying an execution time of said third reset instruction by less than said minimum edge separation time with respect to shifted said execution time of said first and second reset instructions.

11. A method of resolving reset conflicts in a phased-reset SLM system, comprising:

generating reset instructions having at least one conflict;

identifying said at least one conflict; and shifting an execution time of a selected one of said reset instructions according to a conflict resolution method to achieve a resolution of said at least one conflict.

12. The method as recited in claim 11 wherein said at least one conflict involves first and second reset instructions and said conflict resolution method includes shifting said execution time of a selected one of said first and second reset instructions by a fraction of a minimum edge separation time until execution times of said first and second reset instructions are separated by at least said minimum edge separation time.

13. The method as recited in claim 11 wherein said at least one conflict involves first and second reset instructions and said conflict resolution method includes shifting said execution time of a selected one of said first and second reset instructions by a fraction of a minimum edge separation time until execution times of said first and second reset instructions are separated by at least a reset pulse length time plus said minimum edge separation time or at most said reset pulse length time minus said minimum edge separation time.

14. The method as recited in claim 11 wherein said at least one conflict involves first and second reset instructions and said conflict resolution method includes shifting said execution time of a selected one of said first and second reset instructions by a fraction of a minimum edge separation time until execution times of said first and second reset instructions are separated by at least a reset pulse length time plus an offset pulse length time plus said minimum edge separation time or at most said reset pulse length time plus said offset pulse length time minus said minimum edge separation time.

15. The method as recited in claim 11 wherein said at least one conflict involves first and second reset instructions and said conflict resolution method includes shifting said execution time of a selected one of said first and second reset instructions by a fraction of a minimum edge separation time until execution times of said first and second reset instructions are separated by at least an offset pulse length time plus said minimum edge separation time or at most said offset pulse length time minus said minimum edge separation time.

16. The method as recited in claim 11 wherein said at least one conflict involves first and second reset instructions and said conflict resolution method includes delaying an execution time of said second reset instruction by at least a fraction of a minimum edge separation time.

17. The method as recited in claim 16 wherein said conflict resolution method includes delaying an execution time of said second reset instruction by an entirety of said minimum edge separation time.

18. The method as recited in claim 11 wherein said at least one conflict involves first, second and third reset instructions and said conflict resolution method includes shifting said execution time of a selected one of said first and second reset instructions by a fraction of a minimum edge separation time until execution times of said first and second reset instructions are separated by at least said minimum edge separation time and delaying an execution time of said third reset instruction by less than said minimum edge separation time with respect to said first and second reset instructions.

19. The method as recited in claim 11 wherein said at least one conflict involves first, second and third reset instructions and said conflict resolution method includes shifting said execution time of a selected one of said first and second reset instructions by a fraction of a minimum edge separation time until execution times of said first and second reset instructions are separated by at least said minimum edge separation time or at most a reset pulse length time minus said minimum edge separation time and delaying an execution time of said third reset instruction by less than said minimum edge separation time with respect to said first and second reset instructions.

20. The method as recited in claim 11 wherein said at least one conflict involves first, second and third reset instructions and said conflict resolution method includes shifting said execution time of a selected one of said first and second reset instructions by a fraction of a minimum edge separation time until execution times of said first and second reset instructions are separated by at least said minimum edge separation time and delaying an execution time of said third reset instruction by less than said minimum edge separation time with respect to shifted ones of said first and second reset instructions.

21. A projection visual display system, comprising:

a spatial light modulator including a digital mirror device (DMD) configured to generate real-time images from an input signal;

a sequence generator coupled to said DMD;

a DMD reset waveform controller coupled to said DMD; and a reset conflict arbiter coupled between said sequence generator and said DMD reset waveform controller and configured to receive reset instructions containing conflicts from said sequence generator, resolve said conflicts by shifting an execution time of a selected one of said reset instructions according to a conflict resolution method and transmit said reset instructions, free of said conflicts, to said DMD reset waveform controller.

* * * * *